US006352106B1

(12) United States Patent
Hartman

(10) Patent No.: US 6,352,106 B1
(45) Date of Patent: Mar. 5, 2002

(54) HIGH-EFFICIENCY PUMPING AND DISTRIBUTION SYSTEM INCORPORATING A SELF-BALANCING, MODULATING CONTROL VALVE

(76) Inventor: Thomas B. Hartman, 9905 39th Dr. NE., Marysvale, WA (US) 98270

( * ) Notice: Subject to any disclaimer, the term of this patent is extended or adjusted under 35 U.S.C. 154(b) by 0 days.

(21) Appl. No.: 09/564,348

(22) Filed: May 4, 2000

Related U.S. Application Data

(60) Provisional application No. 60/133,204, filed on May 7, 1999.

(51) Int. Cl.[7] .......................... F25D 17/02; G05D 23/00
(52) U.S. Cl. ....................... 165/293; 62/201; 236/78 D; 237/8 R
(58) Field of Search ................................ 236/78 D, 38, 236/36, 75; 237/8 R; 62/201; 165/293, 300; 700/282

(56) References Cited

U.S. PATENT DOCUMENTS

| 3,780,532 | A | | 12/1973 | Norbeck et al. ............... 62/201 |
| 4,085,594 | A | | 4/1978 | Mayer .......................... 62/171 |
| 4,252,751 | A | | 2/1981 | Shito ........................... 261/26 |
| 4,282,718 | A | | 8/1981 | Kountz et al. ................. 62/115 |
| 4,327,559 | A | | 5/1982 | Spethmann ................... 62/179 |
| 4,474,027 | A | | 10/1984 | Azmi et al. ................... 62/171 |
| 4,495,777 | A | | 1/1985 | Babington ................... 62/185 |
| 4,554,964 | A | | 11/1985 | Awano et al. ................. 165/39 |
| 4,589,060 | A | | 5/1986 | Zinsmeyer ................... 364/148 |
| 4,932,218 | A | | 6/1990 | Robbins ....................... 62/171 |
| 4,936,107 | A | | 6/1990 | Kitagaki et al. ............... 62/184 |
| 5,040,377 | A | | 8/1991 | Braun et al. ................... 62/183 |
| 5,070,704 | A | | 12/1991 | Conry .......................... 62/175 |
| 5,138,844 | A | | 8/1992 | Clanin et al. .................. 62/89 |
| 5,197,537 | A | * | 3/1993 | Chigira et al. .......... 165/293 X |
| 5,309,727 | A | | 5/1994 | Duff et al. ..................... 62/117 |
| 5,318,106 | A | * | 6/1994 | Dorini et al. ............. 62/201 X |
| 5,385,030 | A | | 1/1995 | Kitagawa et al. ............. 62/160 |
| 5,425,503 | A | | 6/1995 | Corso .......................... 237/63 |
| 5,564,625 | A | * | 10/1996 | Straub ...................... 236/78 D |
| 5,600,960 | A | | 2/1997 | Schwedler et al. ............ 62/99 |
| 5,626,025 | A | | 5/1997 | Hyde .......................... 62/117 |

OTHER PUBLICATIONS

"FP5—Energy Saving Inverter for Fan and Pump Applications", Saftronics Brochure, PN 027–2004, rev 12/96.
"VLC–853C3 BACtalk Alerton Programmable Visual*Logic* Controller", Alerton Technologies Specification Sheet, LTBT–VLC853C3, 1/97.
"H–720 High Accuracy 4–20 mA Output", Veris Industries Inc. Analog Current Sensors Specification Sheet.
"KT™ 6300, 6400 Split–core kW/kWH Transducers . . . Enercept KT™", Veris Industries Inc. Power Transducers Specification Sheet.

* cited by examiner

*Primary Examiner*—William Wayner
(74) *Attorney, Agent, or Firm*—Stoel Rives LLP

(57) ABSTRACT

The present invention is a new self-balancing modulating control valve for use in a variable-flow fluid distribution system supplying a plurality of loads, which when installed at each load permits a smaller pumping head at all flow conditions. The purpose of this invention is to develop a valve for a variable-flow fluid distribution system that uses less energy than current systems by requiring a near zero pressure drop across the valve but still operates effectively at all load and flow conditions. This invention can allow electronically actuated ball-type valves that are now available to operate reliably and with a longer life by achieving effective control with less frequent reposition requirements.

11 Claims, 4 Drawing Sheets

HIGH-EFFICIENCY PUMPING AND DISTRIBUTION SYSTEM INCORPORATING A SELF-BALANCING, MODULATING CONTROL VALVE

RELATED APPLICATIONS

This application claims priority from U.S. Provisional Patent Application No. 60/133,204, filed May 7, 1999.

TECHNICAL FIELD

This invention pertains to the field of heating, ventilation, and air conditioning and, more specifically, to an improved type of control valve and method of actuation for improved efficiency of operation and longer valve and actuator operating life in a variable-flow fluid distribution system.

BACKGROUND OF THE INVENTION

This invention pertains to systems in which a fluid, such as hot or chilled water, is pumped into a header or main distribution network with the intention of distributing it into a series of outlets or devices wherein the quantity of such fluid through each outlet into each device is intended to be regulated so as to meet a particular condition such as a variable thermal load or other variable condition that requires a continuously regulated, variable flow through such outlet into such device. Fluid distribution systems are regularly employed in buildings and industrial facilities for heating, air conditioning, and many processes in which continuously regulated flow through multiple outlets and into multiple devices is required to meet constantly changing load requirements. Typical applications of such systems include heated or chilled water distribution systems that serve multiple thermal loads, each with the capacity to continuously adjust the flow through a thermal device (air coil, radiant panel, or other heat transfer device).

Such a system is shown in FIG. 1. In FIG. 1, a fluid distribution system serves a number of loads, A through N, each of which employs a modulating valve 111A through 111N and a modulating valve actuator 116A through 116N operated by a control device 120A through 120N that is capable of sending a control signal 117A through 117N, the purpose of which is to adjust the fluid flow through the load to meet the current load requirements. A load can be any end device or equipment that is served by the fluid distribution system.

The flow of fluid, in this case water, through each outlet is regulated to control the flow of chilled or heated water through a coil 114A through 114N, which conditions air that is being circulated from the space and through the coil by a fan 118A through 118N. The valve can be installed on the inlet to the load, or the outlet from the load, but is usually installed on the outlet as shown in FIG. 1 to reduce noise of the water in the coil, which would be transferred to the air. Positioning of the valve on the load outlet is also preferred to reduce the temperature extremes to which the valve is exposed. The opening of each water control valve is modulated to maintain a specific temperature of air being supplied to the space as measured by a supply air temperature sensor 122A through 122N or to maintain some other parameter that requires continuously adjustable flow through the load. The temperature of the space is often regulated by another temperature sensor 124A through 124N, which is located in an enclosed area or space 128A through 128N, or as required to sense the temperature, and therefore load condition, of the space. When employed to modulate heating or cooling water for commercial or industrial processes, the configuration in FIG. 1 may vary slightly. The method of obtaining an error signal to control a load valve for space or process thermal control is well known and not a subject of this invention.

Such a hydronic thermal distribution system may be quite extensive, serving an entire building, or sometimes multiple buildings. To ensure adequate fluid is supplied at all times to all the loads, the prime mover, in this instance one or more electrically driven centrifugal pumps 150, which circulate water through a closed circuit that is heated or cooled by a heat exchanger 158 or some other means, is often operated by a variable speed drive 154. Pump motor speed is adjusted by a digital or other type controller 156 to maintain a differential pressure between a water supply header 162 and water return header 166, using a differential pressure sensor 168. The differential pressure sensor is typically installed at, or very near, the end of the distribution system to ensure the design fluid pressure is maintained at a minimum setpoint throughout the distribution circuit.

FIG. 1 is typical of the type of hydronic pumping systems that are employed to distribute heated or chilled water to systems within buildings, or to multiple buildings in a campus type arrangement. The distribution system in FIG. 1 serves a total of "N" loads, but only the first (A) and last (N) are shown. Flow to each device is regulated by some thermal sensing means linked to a controller that operates a modulating valve. The pump(s) is (are) controlled by one or more differential pressure sensor(s) at or near the end of the distribution piping main(s). This method of regulating pump operation is also well known and not a subject of this invention.

In such systems, each valve is modulated from full closed to full open to meet the flow or capacity requirements of the device to which it is connected. For example, if, as in FIG. 1, the device is a heating or cooling coil in an air supply system for comfort conditioning, the valve may be modulated to maintain a specific air temperature into the space served by the device. As the load in the space changes due to loads external or internal to the space, the space temperature sensor senses the change in space temperature and control logic is employed to adjust the valve in order to change the temperature of the air supply to the space. In other applications, the control valve may be modulated to maintain parameters other than air discharge or space temperature. In present art, each modulating control valve is carefully selected to ensure when full open the valve will permit the correct flow to meet the maximum design load at the design distribution pressure conditions.

Distribution systems of the type shown in FIG. 1 are very commonly employed in comfort and process control systems, but they do have several important limitations that reduce their effectiveness and efficiency. Furthermore, such conventional systems require very frequent valve repositioning and thus do not work effectively with newer electronically operated "ball" style valves for which frequent repositioning reduces their life. In addition, conventional design practice encourages designers to size valves with substantial pressure drops across each valve to obtain stable operation. This design practice adds to pumping energy requirements for the system pump or pumps. Finally, although valve sizing is based on a single design pressure across the valve and coil that is used to operate the pump, loads not located near the pressure sensor are often subject to a wide range of pressures that are generally much larger than the design pressure. This causes control instability and also leads to a system problem called "low Delta T" wherein a much larger quantity of fluid must be pumped through the system than designed because the temperature difference between supply and return is lower than the design value.

Consider that in the FIG. 1 configuration the presence of the valve 111A very close to the pump makes it very important the valve be carefully sized such that a fall open condition does not result in excessive flow that would limit the flow available to valves farther from the pump. This consideration makes it imperative that the control valves be sized small in comparison to the system piping so that no such "full open" valve will affect the capacity of other valves to serve their loads. Designers accomplish this valve sizing by calculating and specifying a specific "flow coefficient," which is called the "$C_v$" for each valve. The $C_v$ for a valve is the number of U.S. gallons of water per minute (GPM) that will flow through the valve in a wide open position with a pressure drop of 1 psi. It is determined by flow testing.

Because each valve is sized with a valve $C_v$ specifically selected for the load it serves, there may be as many different valve sizes as there are loads served. With ball-type valves, the custom $C_v$ can be obtained by employing a ball with a custom diameter hole bored through it (smaller than the full size bore), such that when it is full open, it will allow only the design maximum flow at the design pressure. In addition to requiring a large number of different valves, when the orifice (bore) of a ball valve is smaller than full size, the valve loses its ability to modulate flows smoothly over the full range of actuation. As the bore through the ball is reduced, the first and last few degrees of rotation will not affect flow at all, and the change in flow compared to rotation between the midpoints of rotation is much increased, such that ball valves with small bores cannot practically provide any modulation at all. For example, a valve that has a bore one-half the diameter of a full size bore spends 70 degrees of its 90 degree rotation without any flow change. As the valve starts rotating from the fully closed position, there is no flow for nearly the first 35 degrees of rotation. From 35 degrees to 55 degrees of rotation, flow changes from 0% to 100%. There is no further change as the valve is rotated the remaining 35 degrees. Therefore the change in flow with respect to small increments of rotation for these partially ported valves is either zero or very large, making them very difficult to control.

In addition to this controllability issue, consider that at low flow conditions in the FIG. 1 configuration, each valve is subjected to its highest differential pressure because the pressure drop through the load is very low at these conditions. To provide good control at high differential pressure and low flows is usually the most difficult point of control for valves. To accomplish this, it is often useful to provide very tight control with rapid repositioning based on a continuous feedback signal. Control feedback and repositioning every several seconds or less is often recommended. Older style globe-type control valves with linear pneumatic actuators could accept this service. However, the newer electronic actuators cannot be repositioned nearly as many times without gear train wear and early failure. Whereas the pneumatic cylinder type actuators have a mean time between failures of millions of reposition cycles, the new electronic actuators and ball valve combinations have a mean time between failure of about one tenth that number.

From an energy perspective, the distribution pumping energy required is a function of flow and pressure requirements. When one or more centrifugal pumps are employed as the prime mover in the FIG. 1 distribution configuration, and when the flow of the pump is regulated by a variable speed drive, the flow capacity of the pump varies with the shaft speed of the pump. However, the pressure, or head, capacity of the pump falls with the square of the speed reduction. At the same time, the required pump power decreases with the cube of the speed reduction. These relationships are called the pump laws and are well known and regularly employed in pump applications. So, for example, a centrifugal pump can supply 50% flow at 50% speed and require only 12.5% ($0.5^3$) of the full flow power, but only if the pressure at which the fluid is supplied is permitted to fall to 25% ($0.5^2$) of the full flow pressure. If the supply pressure cannot be allowed to fall as the flow requirement falls, then the speed of the pump cannot be reduced as much as theoretically possible and the power requirements at reduced flow conditions are increased. Because the system in FIG. 1 is operated to maintain a constant pressure across the distribution header at all flow conditions, the pressure is not permitted to fall significantly as the load decreases such that the speed of the variable speed pump must be maintained to provide pressure, not flow. This inability to reduce the speed as the flow requirements decrease because of the need to maintain higher pressures to offset the valve pressure drops results in loss of pump efficiency and less energy reduction than would otherwise be possible at part load conditions.

Imagine in FIG. 1 that there are only two loads, and the loads in space 128A has dropped significantly, but the load in space 128N is still near full load such that the total system flow requirement is now about one-half of maximum flow capacity. To achieve the power reduction opportunities offered by a system operating in accordance with the centrifugal pump laws, the pressure differential between the supply and return headers at which the pump is controlled would have to fall to about 25% of the design maximum differential pressure as the pump speed falls to 50%. At this condition, the pressure available to the valve 111N is less than required to achieve full flow so the needed fluid flow would not be met. Thus the pump must operate at a higher speed and higher power requirement than would normally be necessary to meet the pressure drop requirements of the load control valves.

If the designer simply installed larger valves on each load to make it possible to satisfy loads as the pump slows, then a fully open valve at higher pump speeds (and higher differential pressure across the valves) would result in an overflow of water through the coil supplied by the valve. Because of the limited heat transfer capacity of the coil, such an overflow condition would cause inefficient operation due to excess flow. Such overflow could also cause some loads at the end of the distribution network to be starved of sufficient water to meet their loads and may cause unstable operation of other loads.

Therefore, in situations wherein the flow through each outlet must be continuously regulated to meet individually variable loads, design guidelines issued by the American Society of Heating, Refrigeration and Air Conditioning Engineers (ASHRAE) continue to recommend control valves be small in size such that the pressure drop across the valve when full open is 25% to 50% of the total system loop pressure drop (ASHRAE Systems Handbook, Section 41.8). This sizing guideline has been found to provide improved control characteristics for systems in FIG. 1 configurations. However, the substantial pressure drop across the control valves requires additional pumping energy at all flow conditions.

In distribution systems that are patterned after FIG. 1, the pressure drop due 15 to the modulating control valve and load together account for approximately 50% to 75% of the total system loop pressure drop when designed in accordance with the ASHRAE recommendations. The actual percentages vary, but they are typically near these values. Because both the valves and loads are between the distribution header, the differential pressure sensor usually operates the speed of the motor to maintain this 50% to 75% of pressure setpoint at the end of the distribution header. As the flow decreases, the pressure drop in the piping falls with the square of the flow decrease so that at low flows, the total pump head approaches the pressure setpoint percentage of the maximum flow pump head. This relationship between flow, pump head, and pumping power is shown in FIG. 2. Curve 301 shows the total pumping pressure as a function of system flow for a current art distribution system as diagramed in FIG. 1. Pumping power is proportional to the product of the pressure and flow at each point.

SUMMARY OF THE INVENTION

The operating curve for a system operating with the valve that is the subject of this invention is shown as curve 302 in FIG. 2. One aspect of the present invention is a new self-balancing valve assembly, which when installed at each load permits a smaller pumping head at all flow conditions. Because pumping pressure is proportional to the product of pressure and flow at each point, the pumping power savings at each flow is the vertical difference between the two lines and, for typical systems, varies between 22% and 50% depending on the design criteria and flow point. Furthermore, the invention permits the use of fewer different valve sizes, requiring only full bore ball valves of the various nominal pipe sizes. One aspect of this invention is a new type of valve that requires little or no pressure differential at full flow and still provides overflow protection at higher system flow conditions.

One purpose of this invention is to develop a valve for a variable flow fluid distribution system that uses less energy than current systems by requiring a near zero pressure drop across the valve at full flow but still operates effectively at all load and flow conditions. Further, an embodiment of this invention is intended to assist electronically actuated valves to operate reliably and with long life by achieving effective control with less frequent reposition requirements.

It is known to regulate the speed of a prime mover in response to a demand signal whose value or frequency depends on the condition of the load served (U.S. Pat. No. 5,492,273). It is also known to regulate the speed of a device to attain a desired rate of flow from the device (U.S. Pat. No. 5,202,951). However, one aspect of this invention discloses a new self-balancing valve that uses a preset fluid return temperature limit to continuously scale the allowable range of the valve for smooth and effective operation at very low differential pressure drops across the valve. The present invention also includes a new means of determining when to reposition an electronic actuator that enables less frequent valve repositions when position change signals are small. By including this new variable time interval between repositions, the expected life of the electronic valve actuator is extended.

To accomplish these features, in a presently preferred embodiment, the self-balancing valve employs a local temperature sensor that measures the temperature of the chilled or heated water in the return line from the load served by the valve and certain logic capacity associated with the actuator on each valve. The allowable range of each valve is continuously set anytime the return water temperature reaches a preset adjustable temperature that indicates an "overflow" condition is imminent. Anytime this temperature limit is reached, the range of the valve is reset with that position as the maximum opening. Subsequent position requests are scaled to operate the valve within the range until the range is reset again, which occurs under two conditions. First, if at any time the return temperature falls below (cooling) or rises above (heating) the preset threshold temperature, the range is reset. In that case the allowable range is decreased. Second, if the valve is at the full open limit of the current range and the return temperature has not reached the threshold temperature, the range is also reset. In that case the allowable range is increased.

In this way, each valve automatically changes its range as supply pressure conditions change and as conditions on the load side change. The maximum allowable position of each valve is adjusted based on the temperature of the fluid exiting the load with the ball valve. Thus, the range of each valve is at all times suitable to meet all possible loads but does not permit an overflow of fluid through the load served at any time, regardless of the pressure or other system or load conditions.

Additional objects and advantages of this invention will be apparent from the following detailed description of preferred embodiments thereof, which proceeds with reference to the accompanying drawings.

DETAILED DESCRIPTION OF A PREFERRED EMBODIMENT

Figure 1:
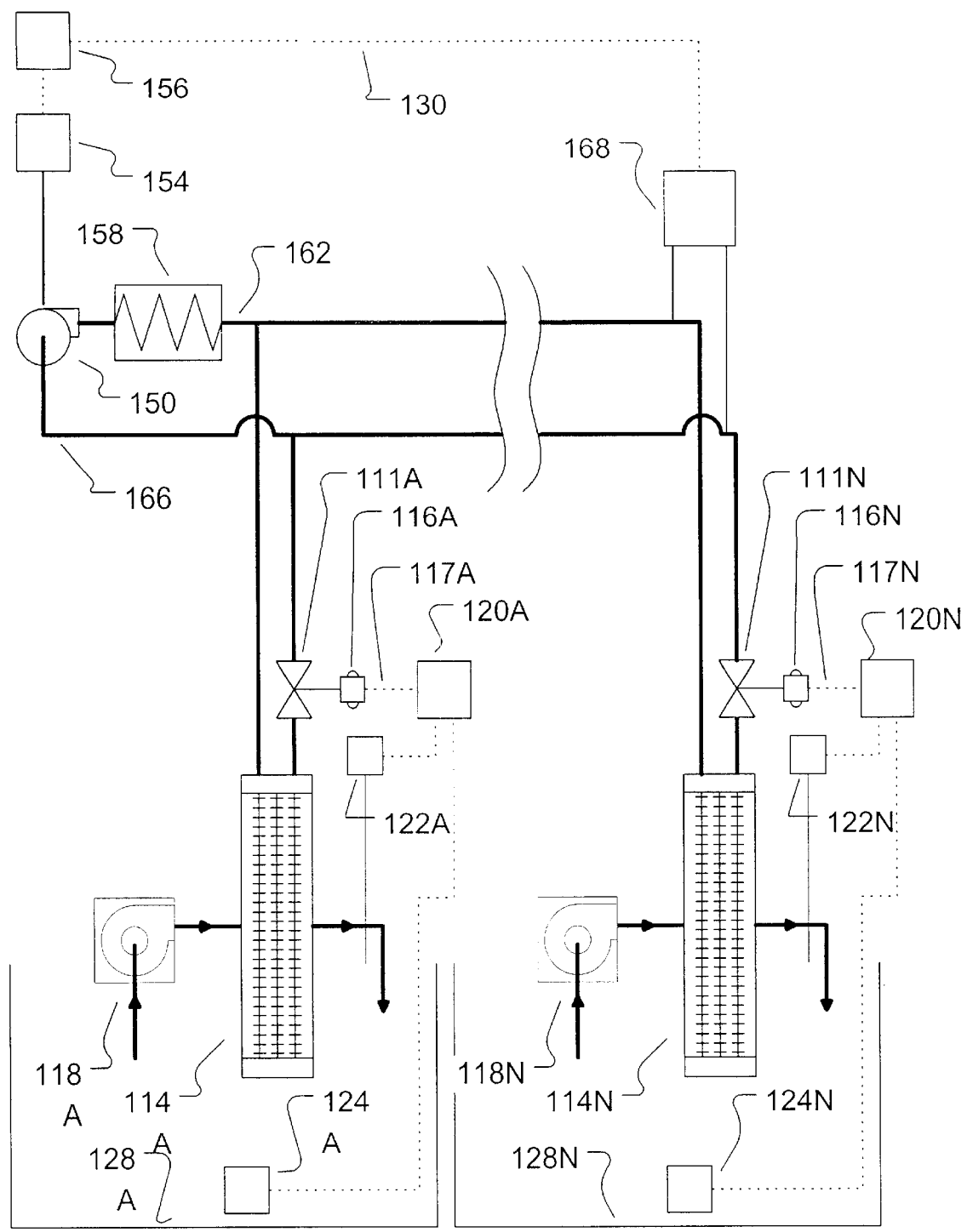
FIG. 1 is a schematic of a typical hydronic pumping system to provide heated or chilled water to the heating or cooling coils of air systems.
Figure 2:
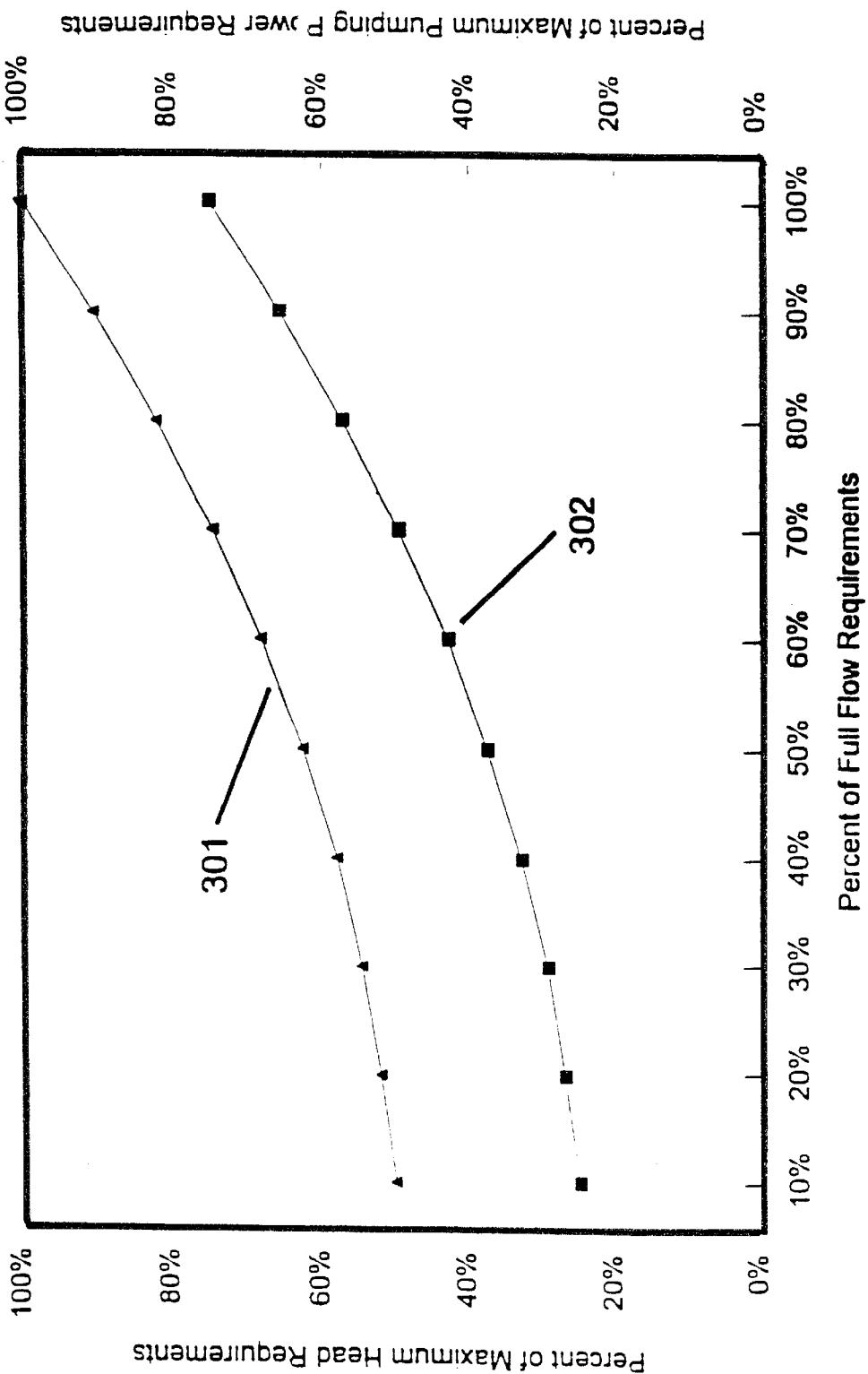
FIG. 2 is a graph of pumping head pressure and pumping power requirements both for current technology pumping systems and for the present invention's pumping system at various flow conditions.

When applied to the system diagramed in FIG. 1, the self-balancing valve is sized with a significantly larger $C_v$ than the valves typically employed in current technology systems. Whereas systems of the FIG. 1 configuration routinely size valves for a pressure drop across the valve at full flow to be about 5 to 20 feet of water column or larger, a preferred embodiment of this invention sizes a valve to match the pipe size of the load to which it is connected and employs a full bore ball, such that the pressure drop across the valve when fully open is approximately the same as an equivalent section of pipe that approaches a "zero" pressure drop for the valve. One example of an embodiment of this invention uses the following three rules to size a valve: First, pick an initial valve $C_v$ value based on the maximum design flow required for the load and a pressure drop across the valve of 5 feet of water column. Second, multiply the initial $C_v$ value by 3, such that the valve can be opened further at periods of time in which the pump speed (and pressure drop) is reduced. Third, select a valve of standard pipe size whose full bore $C_v$ is equal to or greater than the result of the second step.

In this way, the system operates with low pressure drop across the valves under all flow conditions, and, as described below, the system pressure setpoint is about 50% lower than in current systems, which reduces pumping power substantially. Furthermore, an embodiment of this invention incorporates a new method of repositioning the actuators that operate the valves, enabling positioning at intervals of 30 seconds or greater to provide accurate control without hunting.

Figure 3:
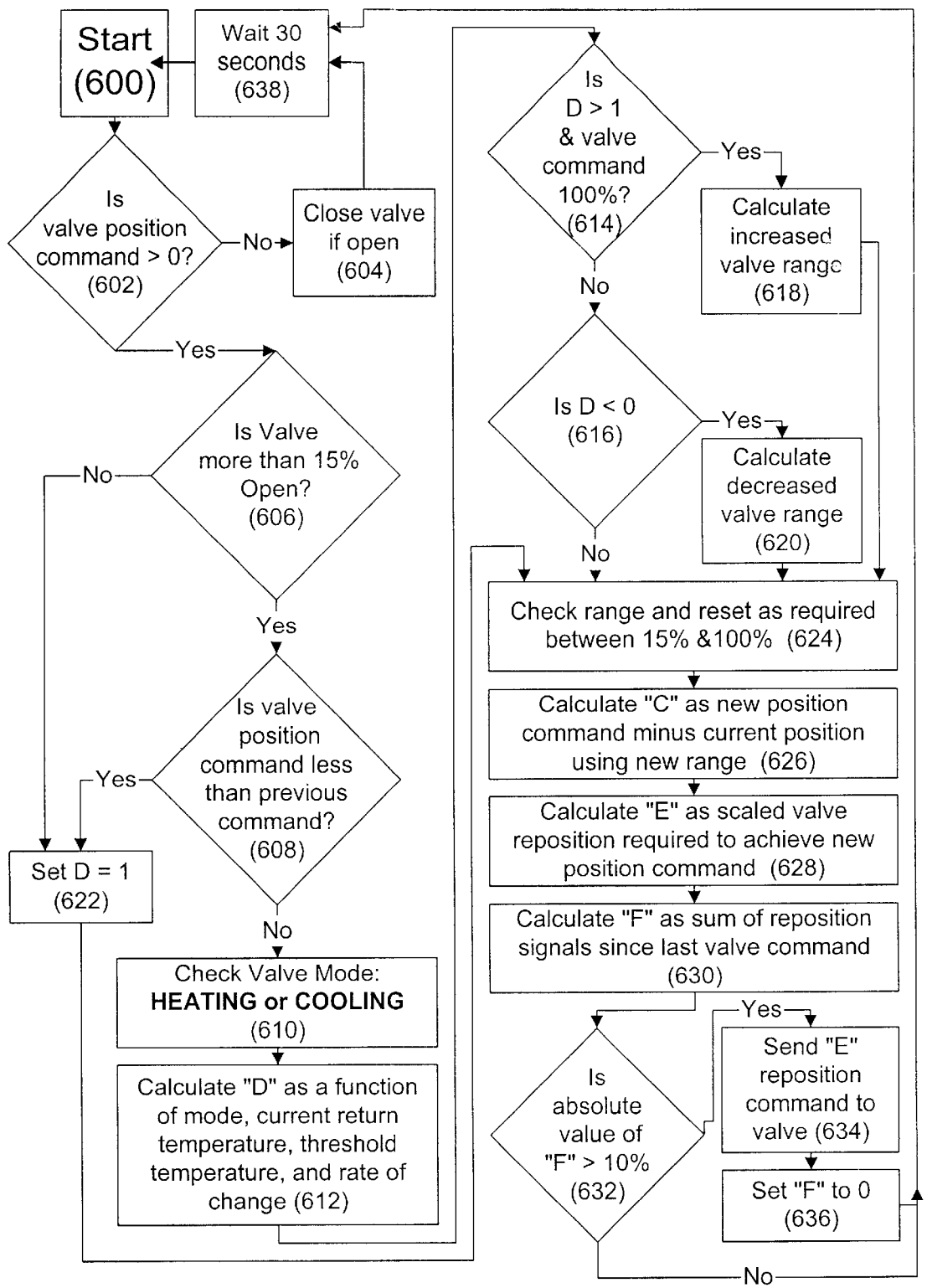
FIG. 3 is a flow chart showing the logic employed to control each load valve using a self-balancing modulating valve with integral temperature sensor.

The logic for the temperature regulated valve system is shown in FIG. 3. When the self-balancing valve is employed, a temperature limit the microprocessor that is employed for actuator operation. For cooling valve applications this is a low temperature limit, and for heating valve applications this is a high temperature limit. As the temperature approaches this limit, further valve opening is blocked. If the fluid temperature passes the limit, the valve will slowly close until the temperature remains within the limit. The position at which that temperature limit or threshold is reached defines the upper limit of the range in which the valve can be positioned. The position range is maintained until (1) it is reduced by reaching the temperature limit within that range or (2) the upper limit of the valve range is achieved without the temperature reaching the limit. In these cases the range is (1) reduced or (2) increased, respectively, based on the conditions at that time.

Overflow is a condition wherein flow above the design rate for the load served by the valve results in a reduced rate of heat transfer from the fluid and is signaled by a less than desired fluid temperature rise (cooling) or fluid temperature decrease (heating) through the load. With this new temperature-controlled, self-balancing valve, the problem of overflowing the loads is eliminated. Only enough cooling or heating water is permitted through the load such that the load is able to transfer at a minimum the predetermined rate of heat flow from the fluid such that the expected temperature rise or decrease of the fluid is achieved. Anytime the preset outlet temperature indicates the minimum specified temperature increase (decrease) is not occurring, the valve is not permitted to open further and will slowly close until the preset outlet temperature is achieved.

Thus, the valve automatically ranges itself to match the available head from the pumping system and changing conditions on the load side. Valves near the pump in the FIG. 1 system are subject to wide variations in pressure. As the pumping pressure rises to compensate for piping friction losses such that the pressure setpoint is maintained at the end of the system, pressure at valves close to the pump may increase significantly. As the pressure rises, valves will reduce their range as required to ensure the return water temperature does not exceed the preset limit.

FIG. 3 shows the control logic for one embodiment of a system that employs a modulating valve with integral temperature sensor. The routine is executed only approximately every 30 seconds to minimize wear and tear on the electric actuator and the valve. With particular reference to FIG. 3, the method begins at initial location 600. The first step in the method is an initial decision 602 as to whether the valve position command from the load controller greater than zero. If the valve command is greater than zero, then the controller system is being operated to achieve its desired function, either heating or cooling. If the valve command is not greater than zero, the valve is closed 604,if it is open, and the routine is paused for a nominal 30 seconds before restarting 638.

If the valve position command is greater than zero, the next step is to determine if the valve is more than 15% open 606.If it is not, the self-balancing rules do not apply and the self-balancing variable, "D" is set to 1, as in step 622, which is the neutral value, and the method continues with the valve range resetting step 624. The reason for determining that the valve is more than 15% open 606 is to ensure fluid flow through the valve before self-balancing starts. This enables the temperature sensor to monitor the fluid temperature.

Next, a check is made to see if the valve is closing when compared to the last command. Determination of the valve position command relative to the previous command is represented in step 608. The self-balancing is applied only when the valve is opening, so if the valve is closing, the self-balancing variable, D, is again set to 1, the neutral value 622. If the valve position command is determined not to be less than the previous command in step 608, the valve is not closing.

If the valve is more than 15% open and not closing, the next step is to check which mode the valve is in 610 and to calculate the self-balancing variable, D, 612 based on the return temperature limit (or threshold temperature), the return fluid temperature, and the rate of change of that temperature. Determining the valve mode 610 can indicate that the valve is in heating or cooling mode. This valve mode is also used in calculating the D value 612. Although the actual formulas used in calculating the D value may be modified depending on particular system or load requirements, a preferred embodiment uses the following formulas:

$$\text{For Cooling Mode} \Rightarrow D = \frac{FT - TL - 10*(A - FT)}{C_1}$$

$$\text{For Heating Mode} \Rightarrow D = \frac{TL - FT - 10*(FT - A)}{C_2}$$

"FT" is the current temperature of fluid as detected by the temperature sensor. "TL" is the present threshold return fluid temperature. "A" is the temperature measured during the most recent iteration through these steps (approximately 30 seconds ago) and is used to calculate the current rate of change. $C_1$, and $C_2$ are constants. Although they can change depending on valve characteristics, they are initially set at 4 and 8 respectively. In a preferred embodiment, the temperatures are measured in degrees Fahrenheit.

After calculating the value of D 612, the valve range resetting step 624 is conducted according to the value of D and the current state of the valve position within its current range. Conducting that step first requires a determination of whether the D value is greater than 1 and the valve is wide open 614. If the value of D is greater than 1 and the valve is wide open, an embodiment of this process calculates an increased valve range 618. If the valve is not wide open, or the D value is not greater than 1, the process proceeds to determine whether the D value is less than 0 616. If the D value is less than 0, the process calculates a decreased valve range 620. Although the actual method for calculating the new range can be varied depending on requirements or characteristics of the particular system involved, a preferred embodiment uses the following formula:

$$NR=CR+C_3*D$$

"NR" is the new range, "CR" is the current (prealteration) range, "D" is the self-balancing variable previously calculated, and "$C_3$" is a constant that determines the rate of adjustment and varies depending on the valve type. The $C_3$, value is empirically determined and may very depending on the particular system involved, but in a presently preferred embodiment, if the D value is less than 0, $C_3$ is 5, and if the D value is greater than 1, $C_3$ is 10. If the D value equals or falls between 0 and 1, the valve is in a neutral state and no repositioning occurs. Also, in a preferred embodiment, the NR (new range) value is neither less than 15% nor greater than 100%. If the D value is not less than 0 616 or once the increased or decreased valve range is calculated 618 or 620, the next step is the valve range resetting step 624. For example, the following table illustrates calculations for a cooling system. The time periods are meant to show successive iterations, but they are not necessarily equally spaced or at constant time intervals.

| Time | Position Command | FT | TL | $C_1$ | A | D | CR | $C_3$ | NR | Change |
|---|---|---|---|---|---|---|---|---|---|---|
| 1 | 80% | 58 | 56 | 4 | 58 | 0.5 | 50% | 10 | 50% | none |
| 2 | 100% | 59 | 56 | 4 | 58 | 3.25 | 50% | 10 | 82.5% | increase |
| 3 | 100% | 56 | 56 | 4 | 57 | −2.5 | 82.5% | 5 | 70% | decrease |
| 4 | 100% | 55 | 56 | 4 | 56 | −2.75 | 70% | 5 | 56.3% | decrease |
| 5 | 90% | 56 | 56 | 4 | 56 | 1 | 56.3% | 5 | 56.3% | none |

Once the range is established, a new valve position is calculated based on the valve position command signal and the current valve position. This procedure is depicted in step 626 and step 628. For example, if the valve range is 50% and the valve position command is 80%, then the actual valve position is 40% (80%×50%). If the valve range is 33.8% and the valve command is 90%, then the actual valve position is 30.4% (90%×33.8%).

Although, for simplicity reasons, it is not shown in the above table, in a preferred embodiment, any time the required valve reposition adjustment is small, no action is taken until the absolute sum of the reposition signals since the last command signal was sent to the valve position controller 630 totals at least 10% of the total valve movement 632. This reduces the number of valve repositionings required and eliminates hunting near the setpoint, while at the same time ensuring that precise control is obtained. Threshold values other than 10% could similarly be used depending on the specific distribution system.

If the sum of the reposition signals 630 totals more than 10%, a reposition command is sent to the valve position controller 634 and the sum of the reposition signals 630 is reset to zero 636. In a preferred embodiment, the actual value of the reposition command sent to the valve is the quantity of the last position command signal received, not the aggregate of signals totaling 10% or greater. For example, if the first position command is 5%, the valve is not repositioned (because the position command is less than 10%), but the 5% value is recorded. If the second position command is 7%, the valve is repositioned (because the aggregate is now 12%), but the value of the reposition is only 7% (the most recent position command signal received). If the absolute sum of the reposition signals since the last command to the valve actuator does not total at least 10%, no reposition signal is sent during that program execution. Once a reposition has been made and the sum reset to 0, 636, or if the sum of the reposition signals does not total 10% 632, the routine is paused for a nominal 30 seconds before restarting 638.

Figure 4:
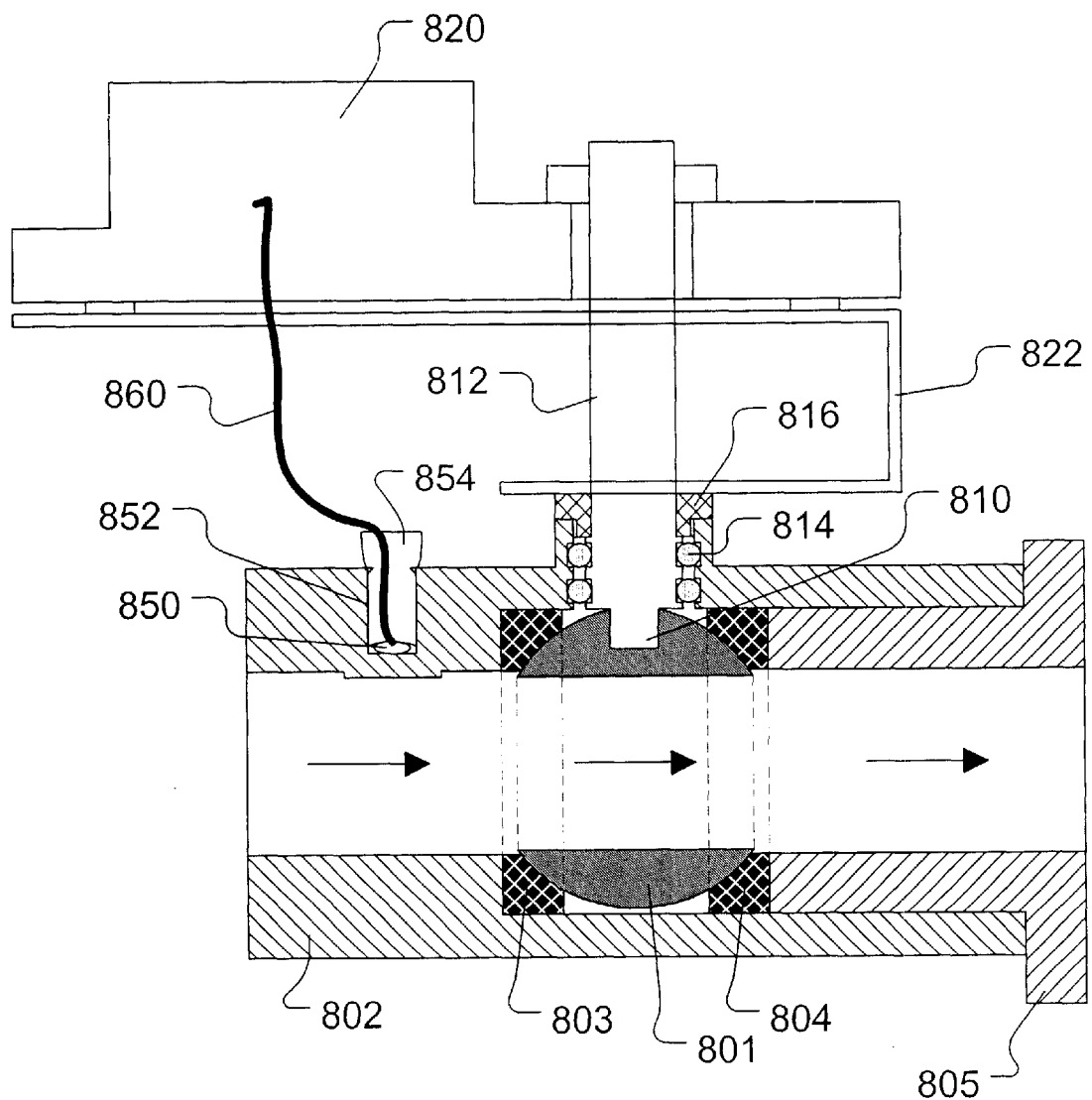
FIG. 4 is a diagram of a self-balancing modulating valve, in a ball valve configuration, with an integral temperature sensor.

FIG. 4 shows a cutaway view of one embodiment of the new type of valve that is the subject of one aspect of this invention. This valve differs from standard modulating ball valves in that a local temperature sensor has been added along with logic and calculating capacity in the actuator such that the range of the valve is continuously adjusted to meet the system design. The valve logic enables automatic valve ranging as described above. Anytime the threshold temperature is reached at the return, the upper limit of the valve range is reduced to the valve position at which the preadjusted threshold temperature is achieved. Similarly, the automatic valve ranging increases the valve range when and if the upper limit of the current range is reached but the return temperature has not reached the preset threshold limit. While the preferred embodiment is a ball valve, this invention is applicable to any type of modulating valve.

Illustrating one embodiment of an aspect of this invention, FIG. 4 depicts a cutaway view of a self-balancing modulating valve in a ball valve configuration. Here a ball 801 with a cylindrical bore is installed in a valve body 802, between two seals that may be Teflon or some other watertight and friction resistant material. The ball and seals 803 and 804 are held into the valve body by a retainer 805 that is threaded or in some other manner fastened into the valve body. The ball has a notch 810 that may be a square, splined, or some other configuration such that a valve stem 812 can be inserted into the valve and achieve a positive connection in order to rotate the ball 90 degrees. When the ball is rotated such that the bore through the ball is aligned with that of the valve body as shown in FIG. 4, the flow of fluid is permitted through the assembly. When the ball is rotated 90 degrees from this position, the flow of fluid is blocked.

The valve stem employs seals 814 that ensure the fluid does not leak out around the valve stem. These seals may be O-rings or packing glands. The valve stem also has a cap 816 that may be threaded into position or held by some other means. The cap holds the stem into the body of the valve.

An electric valve actuator 820 is employed to rotate the valve ball to the desired position based on a signal from a controller that may be located in the actuator or may be remotely located. An actuator mounting bracket 822 is designed to hold the actuator and also provide some separation of the actuator from the valve to isolate it thermally from the fluid flowing through the valve. All the above features are regularly incorporated into electronically actuated ball valves and are not new.

This invention employs this prior art valve but adds a small temperature sensor 850 that is mounted in a well 852, such that it accurately measures the temperature of the fluid flow through the valve but does not restrict the flow of the fluid. The temperature sensor can be a thermistor type sensor, which is very low cost, offers excellent stability and thermal response to temperature, and is small, about the size of a match head. However, any type of temperature sensor could be employed for this purpose.

The temperature sensor is held in place by a compressible thermally insulating material 854 such as neoprene, which is held into position by threads, barbs in the well, or by a cap or some other device that is not shown. The temperature sensor is connected electrically to the actuator with an electric cord 860. However, the temperature sensor may also be connected to a position controller remote from the actuator, which is not shown. Remote connection is employed when the valve is installed on the supply line to the load. In that case, the temperature sensor is removed from the well on the valve and strapped onto the return line using an appropriate clamp or strap.

An alternative embodiment of this invention also envisions a valve consisting of two temperature sensors, one of which is placed on the supply line and one placed on the return line such that the actual differential temperature through the load can be measured at all times. Such a valve would operate just as the self-balancing valve described herein except the setpoint would be the differential temperature across the load. This valve would be of use when the supply water temperature varies as an energy conservation measure, or for other reasons.

It will be obvious to those having skill in the art that many changes may be made to the details of the above-described embodiment of this invention without departing from the underlying principles thereof. The scope of the present invention should, therefore, be determined only by the following claims.

What is claimed is:

1. A self-balancing valve and actuator assembly for use in a variable-flow fluid distribution system, comprising:
   a valve body capable of connecting the valve to a pipe;
   a flow regulating device located within the valve body, the flow regulating device being positionable for controllably regulating fluid flow through the valve body;
   an electronic input for receiving a position command signal from a load controller;
   a local temperature sensor arranged for measuring an actual fluid temperature of fluid passing through the valve body; and
   a position controller mechanically coupled to the flow regulating device for modulating the position of the flow regulating device, wherein the position controller stores a threshold temperature determined by system requirements of a load within the distribution system, receives a measurement of the actual fluid temperature from the temperature sensor, receives the position command signal from the electronic input, and modulates the position of the flow regulating device based on the threshold temperature, the actual fluid temperature, and the position command signal.

2. The self-balancing valve and actuator assembly of claim 1, wherein the valve body is constructed so that the temperature sensor can be mounted for allowing accurate measurements of the actual fluid temperature without restricting the flow of the fluid through the valve.

3. The self-balancing valve and actuator assembly of claim 1, further comprising means for securing the temperature sensor to a return line exiting the load.

4. The self-balancing valve and actuator assembly of claim 1, further comprising a second temperature sensor;
   wherein the first temperature sensor is installed in a supply line to the load, the second temperature sensor is installed in a return line to the load, and the installed first temperature sensor and the installed second temperature sensor are for measuring an actual differential temperature across the load; and
   wherein the threshold temperature is a threshold differential temperature across the load determined by system requirements of the load.

5. The self-balancing valve and actuator assembly of claim 1, wherein the flow regulating device is an electronically actuated ball valve having a bore hole with a diameter.

6. The self-balancing valve and actuator assembly of claim 5, wherein the pipe has a predetermined inner diameter and the bore hole diameter is sized substantially identical to the pipe inner diameter.

7. A method for controlling a modulating valve for use in a variable-flow fluid distribution system supplying a load, the load having a modulating valve, a modulating valve position controller for controllably regulating fluid flow through the modulating valve, and a load controller for sending a position command signal to the position controller, comprising the steps of:
   identifying an initial operating range of the modulating valve;
   selecting a threshold temperature;
   measuring an actual temperature of fluid flowing through the modulating valve;
   comparing the actual temperature to the threshold temperature;
   inputting the position command signal to the position controller;
   determining a current operating range for the modulating valve based on the position command signal and the comparison of the actual temperature to the threshold temperature; and
   adjusting the initial operating range to achieve the current operating range.

8. A method for controlling a modulating valve for use in a variable-flow fluid distribution system supplying a plurality of loads, each load having a modulating valve, a modulating valve position controller for controllably regulating fluid flow through the modulating valve, and a load controller for sending a position command signal to the position controller, comprising the steps of:
   for each modulating valve:
      (a) selecting a threshold fluid temperature beyond which heat transfer is inefficient for a load;
      (b) identifying an initial operating range for the modulating valve;
      (c) monitoring fluid temperature;
      (d) determining a current position command;
      (e) responsive to the fluid temperature and the current position command, adjusting the operating range for the modulating valve;
      (f) scaling the current position command to the adjusted operating range for the modulating valve; and
      (g) repositioning the modulating valve to the scaled current position command.

9. The method of claim 8, further comprising the step of repeating steps (a) through (g) approximately every 30 seconds.

10. A method for controlling a self-balancing modulating valve in a variable-flow fluid distribution system for supplying fluid to a load, the load including the modulating valve, a temperature sensor, a modulating valve position controller for adjusting fluid flow through the modulating valve, and a load controller for sending a position command signal to the position controller, comprising the steps of:
   (a) predetermining a temperature limit for fluid flowing through the modulating valve;
   (b) using the temperature sensor, measuring an actual temperature of fluid flowing through the modulating valve;
   (c) receiving the position command signal from the load controller;
   (d) responsive to the position command signal and to the actual temperature of the fluid being within the temperature limit, automatically signaling the position controller to increase the modulating valve's operating range;
   (e) responsive to the position command signal and to the actual temperature of the fluid approximating the temperature limit, automatically signaling the position controller to prevent further opening of the modulating valve; and
   (f) responsive to the position command signal and to the actual temperature of the fluid exceeding the temperature limit, automatically signaling the position controller to decrease the modulating valve's operating range.

11. The method of claim 10, further comprising the step of repeating steps (a) through (f) approximately every 30 seconds.

* * * * *